US010735219B2

(12) United States Patent
Bunte et al.

(10) Patent No.: US 10,735,219 B2
(45) Date of Patent: Aug. 4, 2020

(54) SYSTEM AND METHOD FOR PACKET TRANSMISSION IN A COMMUNICATIONS NETWORK

(71) Applicant: BECKHOFF AUTOMATION GMBH, Verl (DE)

(72) Inventors: Thorsten Bunte, Gütersloh (DE); Holger Büttner, Berlin (DE); Erik Vonnahme, Salzkotten (DE); Dirk Janssen, Verl (DE); Thomas Rettig, Rheda-Wiedenbrück (DE); Hans Beckhoff, Verl (DE)

(73) Assignee: Beckhoff Automation GmbH, Verl (DE)

( * ) Notice: Subject to any disclaimer, the term of this patent is extended or adjusted under 35 U.S.C. 154(b) by 11 days.

(21) Appl. No.: 15/959,041

(22) Filed: Apr. 20, 2018

(65) Prior Publication Data

US 2018/0241585 A1    Aug. 23, 2018

Related U.S. Application Data

(63) Continuation of application No. PCT/EP2016/074807, filed on Oct. 14, 2016.

(30) Foreign Application Priority Data

Oct. 21, 2015 (DE) .......................... 10 2015 117 937

(51) Int. Cl.
*H04L 12/40* (2006.01)
(52) U.S. Cl.
CPC ...... *H04L 12/40176* (2013.01); *H04L 2012/4026* (2013.01)
(58) Field of Classification Search
CPC .................. H04L 12/40176; H04L 2012/4026
See application file for complete search history.

(56) References Cited

U.S. PATENT DOCUMENTS 5,109,384 A * 4/1992 Tseung ................. H04L 1/0083
340/2.26
8,676,239 B2 * 3/2014 Hirai ................. G05B 19/4186
455/507

(Continued)

FOREIGN PATENT DOCUMENTS

CN      1777848 A    5/2006
CN    102326409 A    1/2012

(Continued)

OTHER PUBLICATIONS

Office Action dated Apr. 15, 2020 in connection with Chinese Patent Application No. 201680069271.X, 10 pages including English translation.

*Primary Examiner* — Ian N Moore
*Assistant Examiner* — Rushil Parimal Sampat
(74) *Attorney, Agent, or Firm* — Dorsey & Whitney LLP

(57) ABSTRACT

A communications network comprises a plurality of participants. A first participant transmits a message repeating sequence of N≥2 successive messages to a second participant. An action which can be performed by the second participant is assigned to each message in the sequence. The first participant begins to transmit one of the N messages at N successive transmission times $T_I$ (I=0, ..., N-1). Each of the N messages contains a field defining a waiting time. The second participant selects one message from among the messages in the sequence which are successfully received by the second participant as a useful message, measures a time elapsed since reception of the useful message, and performs the action assigned to the useful message when the elapsed time has reached the assigned waiting time.

16 Claims, 8 Drawing Sheets

(56) References Cited

U.S. PATENT DOCUMENTS

| | | |
|---|---|---|
| 2008/0273527 A1 | 11/2008 | Short et al. |
| 2012/0025944 A1 | 2/2012 | Hansen |
| 2012/0057479 A1 | 3/2012 | Maruyama et al. |

FOREIGN PATENT DOCUMENTS

| | | | |
|---|---|---|---|
| CN | 102882753 A | 1/2013 | |
| DE | 102013203550 B3 | 5/2014 | |
| EP | 1615374 A1 * | 1/2006 | ......... H04L 12/1863 |
| EP | 2400778 A1 | 12/2011 | |
| EP | 2527935 B1 | 11/2012 | |
| EP | 2672359 A2 | 12/2013 | |

\* cited by examiner

SYSTEM AND METHOD FOR PACKET TRANSMISSION IN A COMMUNICATIONS NETWORK

CROSS-REFERENCE TO RELATED APPLICATIONS

This patent application is a continuation of PCT Application PCT/EP2016/074807, filed Oct. 14, 2016, which claims priority to German patent application DE 102015117937.7, filed Oct. 21, 2015, entitled KOMMUNIKATIONSNETZWERK, VERFAHREN ZUM BETREIBEN EINES SOLCHEN UND TEILNEHMER IN EINEM KOMMUNIKATIONSNETZWERK, each of which is incorporated by reference herein, in the entirety and for all purposes.

FIELD

The invention relates to a method for operating a communications network, to a communications network having a first participant and a second participant, and to a participant in a communications network.

BACKGROUND

A communications network comprises a plurality of (that is to say at least two) participants connected to one another via suitable message channels. The message channels may comprise wireless and wired channels. In a communications network, information is usually transmitted from one participant to another in the form of discrete data packets. Such data packets are referred to as messages below.

The problem arises in practice of a message not being correctly transmitted from one participant to the other. There are various possible causes of this. Interference in the transmitting participant (the message is not transmitted or is not correctly transmitted), on the transmission path (for example in the case of brief interference in the message channel) and in the receiving participant (for example brief failure of a receiving stage of the receiving participant) comes into consideration.

It is known practice to increase the reliability of the information transmission in the communications network by repeatedly transmitting the information to be transmitted in succession.

In a first method which can be implemented, for example, in conventional field bus systems such as PROFIBUS or else in PROFINET, a first participant (for example a master participant) transmits a message to a second participant (for example a slave participant) and then waits for a response. For example, provision may be made for the slave participant to respond with a separate message. If the first participant does not receive a response within a defined time, the first participant transmits the originally transmitted message once again.

In a similar second method, the participants process the message in passing (for example in the case of EtherCAT). In that case, a first participant can be operated in such a manner that said participant transmits a message and then waits for the return of the transmitted message. If the first participant does not receive the expected returning message, the first participant transmits the originally transmitted message once again.

One disadvantage of these methods is that the transmitting participant must wait for the reception of a message in an event-controlled manner. This may result in an increased interrupt load, in particular in systems in which communication and application run on a common processor.

In a third method, instead of an individual message, a participant transmits a message repeating sequence which comprises a plurality of messages having substantially the same contents. In order to successfully transmit the useful data (that is to say the information to be transmitted), it then suffices for the receiving participant to receive at least one of the messages from the message repeating sequence. A participant may be set up, for example, in such a manner that said participant evaluates a first successfully received message in the message repeating sequence and ignores, that is to say does not evaluate, all further messages in the message repeating sequence which are possibly received by the participant.

If the participant is set up to initiate a particular action in response to the successful reception of the one message in the message repeating sequence, the time at which the action is performed will depend on which message in the message repeating sequence the participant reacts to in one simple embodiment. If the participant does not react to the first message, but rather to a subsequent message in the message repeating sequence, the participant will initiate the action later than if reacting to the first message in the message repeating sequence. This may be problematic, in particular, when a plurality of participants in the communications network are intended to be operated synchronously with the aid of messages which are matched to one another in terms of time, for example in an automated production plant having a plurality of distributed participants which must synchronously perform particular actions, for example the movement of a component.

The patent specification EP 2 527 935 B1 describes a method for operating an automation system, in which a measure of an offset between an occurrence of a synchronization signal and a communications clock is determined on the transmitter side. The determined measure of the offset is transmitted during data transmission to at least one receiver. After receiving the determined measure, the receiver waits for a corresponding period of time to elapse and generates an output signal in response to the synchronization signal after the period of time has elapsed.

SUMMARY

The invention provides a method for operating a communications network, which method can be implemented as simply as possible and is reliable. The invention provides a communications network set up to carry out such a method and a participant which is set up accordingly.

EXAMPLES

According to a first aspect, a first participant of the communications network transmits a message repeating sequence consisting of N successive messages to a second participant, where N≥2. N is the number of messages in the message repeating sequence. The first participant respectively begins to transmit (each) one of the N messages at N successive times $T\_I$ ($I=0, N-1$). Each of the N messages contains a field which defines a waiting time assigned to the respective message $W\_I = T\_(N-1) - T\_I + \Delta W\_I$, where $I = 0, \ldots, N-1$ and where $\Delta W\_I$ is a non-negative tolerance time. A waiting time which is dependent on the transmission time of the relevant message and on the transmission time of the last message in the message repeating sequence is therefore assigned to each message in the message repeating sequence and is selected in such a manner that $T\_I+W\_I=T\_(N-1)+\Delta W\_I$. On the basis of the transmission time $T\_I$, the transmission time $T\_(N-1)$ of the latest message in the message repeating sequence plus a tolerance time is consequently assigned with expiry of the waiting time $W\_I$. The tolerance times $\Delta W\_I$ should each be shorter (preferably considerably shorter) than the interval of time between the earliest and the latest of the transmission times in all messages in the message repeating sequence, that is to say $\Delta W\_I<T\_(N-1)-T\_0$ ($I=0, \ldots, N-1$). The tolerance times $\Delta W\_I$ in all messages in the message repeating sequence are each preferably shorter than the minimum of the intervals between the transmission times, that is to say $\Delta W\_I<MIN\{T\_J-T\_(J-1); J=1, \ldots, N-1\}$. The invention also provides for the second participant of the communications network to select one message from among all messages in the message repeating sequence which are successfully received by the second participant as a useful message and to measure a running time since the reception of the useful message and to perform the action assigned to the useful message when the running time has reached the waiting time assigned to the useful message. The second participant therefore delays the performance of the action assigned to the useful message to a time which is not so dependent on which message in the sequence is selected as the useful message (in which case it is assumed that the transfer time from the first participant to the second participant is the same for all messages). If the tolerance times $\Delta W\_I$ for all messages in the message repeating sequence are identical (that is to say $\Delta W\_I=\Delta W\_0$ for all $I=0$ to $N-1$), the time at which the action is initiated does not depend on the choice of the useful message. In some embodiments, the tolerance time $\Delta W\_I$ for each of the messages ($I=0, \ldots, N-1$) in the message repeating sequence is zero. This causes the action to be performed at the earliest possible time. In other embodiments, it may be advantageous if the tolerance times $\Delta W\_I$ are positive, that is to say are greater than zero. If, for example, the earliest message ($I=0$) in the message repeating sequence is selected as the useful message, a positive tolerance time $\Delta W\_0$ will generally ensure that the second participant receives all subsequent messages in the message repeating sequence (in particular the last message) before the expiry of the waiting time $W\_0$ even if the first message were received somewhat earlier or the last message were received somewhat later than expected. This makes it possible to reduce a risk of the last message in the message repeating sequence being inadvertently processed as the useful message. The second participant can determine the expiry of the waiting time by means of a clocked counter, for example. In one example, the second participant sets the clocked counter to a starting value corresponding to the waiting time upon the selection of the message, and the counter counts in sync until a final value. The reaching of the final value then marks the expiry of the waiting time.

According to one embodiment, the second participant selects the message received earliest by the second participant from among the messages in the message repeating sequence successfully received by the second participant as the useful message. The second participant can then ignore all subsequent messages in the message repeating sequence. This embodiment can therefore be implemented in a technically particularly simple manner. In principle, however, the second participant could select any other successfully received message in the message repeating sequence. For example, in an alternative embodiment, it is conceivable for the second participant, upon successfully receiving a plurality of messages in the message repeating sequence, to select the latest of the successfully received messages. In this alternative embodiment, the second participant would ignore all earlier successfully received messages in the message repeating sequence and would use only the latest message as the useful message.

The action respectively assigned to a message may involve, for example, generating an interrupt which is used by a receiving participant (for example the second participant) to start an application, for example for the purpose of controlling a connected machine or recording a measurement signal.

In principle, different actions can be assigned to different messages in the message repeating sequence. In this case, the action to be performed by the second participant depends on which message in the repeating sequence is selected by the second participant. However, the same action will generally be assigned to all messages in the message repeating sequence, with the result that the action to be performed by the second participant is independent of the selection of the message from the repeating sequence.

In one embodiment, if the second participant receives a further message in the message repeating sequence, the second participant will not perform the action assigned to the further message. This ensures that the second participant performs only the action assigned to the selected message.

According to one embodiment, the second participant forwards each message in the message repeating sequence which is received by the second participant to a further participant of the communications network without waiting for the expiry of the waiting time stated in the message. The waiting time respectively stated in the messages therefore does not influence the transmission of the messages inside the communications network. For the sake of completeness, it is noted that the further participant just mentioned may also be the first participant of the communications network. In this case, forwarding of the message should be understood as returning the message to the first participant.

According to one embodiment, the second participant writes useful data into a useful data field of the received message and forwards the message processed in this manner to a further participant of the communications network (for example back to the first participant or on to a third participant) without waiting for the expiry of the waiting time stated in the message. In particular, provision may be made for the second participant to write the same useful data into each message in the message repeating sequence. This achieves redundant transmission of the useful data provided by the second participant to further participants of the communications network. The message repeating sequence can therefore be updated with useful data from the participants when passing through a plurality of participants connected in series. Processing in passing can be implemented, in particular, in Ethernet field bus systems (for example in the EtherCAT system).

According to one embodiment, the messages in the message repeating sequence each contain the same useful data and/or the same status data. The useful data and/or the status data are therefore provided in a redundant form. If the communications network is an EtherCAT system, the useful data can be understood as meaning one or more datagrams, for example.

According to one embodiment, the messages in the message repeating sequence are processed by the participants in passing. The messages in the repeating sequence therefore pass through the participants one after the other. The number of clock cycles needed by a data bit to pass through a given participant, that is to say the transit time of the bit from the input to the output of the participant, can be permanently set in this case, for example to a particular number of clock cycles. Such a method, for example EtherCAT, may be suitable for real-time requirements, in particular.

According to one embodiment, at a time T_N which is later than T_(N−1), the first participant transmits a further message which does not belong to said message repeating sequence, and the tolerance times ΔW_I are each shorter than T_N-T_(N−1). This makes it possible to ensure that the second participant initiates the action before the second participant receives the further message. This makes it possible to avoid a temporal overlap of the initiation of the action and the reception of the further message and an associated double load on the second participant.

The considerations above accordingly apply to any communications network which is set up to carry out a method according to one of the embodiments mentioned.

The communications network may be, in particular, an Ethernet network, for example an EtherCAT network. An Ethernet network is a network in which the participants communicate with one another using an Ethernet protocol.

The participant according to the invention in a communications network is set up to receive a message repeating sequence consisting of N messages and to select a message in the message repeating sequence which is successfully received by said participant and to evaluate a waiting time defined by the selected message. As a result, the participant is not able to perform an action dependent on the reception of the message immediately after receiving the message, but rather only after expiry of the waiting time, measured from the reception of the selected message. This makes it possible to achieve better synchronization of the action to be performed by the participant with other actions inside the communications network.

According to one embodiment, the participant has a memory and is set up to store a copy of the selected message in the memory at least until the waiting time expires. The participant is therefore able, at least until the waiting time expires, to gather additional information from the message (that is to say information in addition to the statement of the waiting time). The additional information may be useful, in particular, for performing the action. For example, provision may be made for the participant to perform the action on the basis of the additional information.

According to one embodiment, the participant has a clocked counter, to which a final value is assigned, and the participant is set up, in response to the successful reception of a message, provided that the counter is then at its final value: to select the message as the useful message; to determine a starting value corresponding to the waiting time defined by the useful message, to set the counter to the starting value, to start the counter and to stop the counter when the final value is reached; and to perform the action assigned to the message only when the down-counter has reached the final value. The period of time between starting and stopping the counter is referred to as the waiting interval. The length or duration of the waiting interval is the waiting time. It is recognized that two effects are linked to the waiting interval. The first effect can be seen in the fact that the action related to the received message is performed only at the end of the waiting interval. The second effect is that each subsequent message received during the waiting interval is ignored by the participant in the sense that the participant does not perform an action assigned to the subsequent message. In this embodiment, that message which is successfully received first after the counter has been stopped at its final value is consequently always selected. In this embodiment, the above-mentioned tolerance times ΔW_I should be so short that the waiting interval is finished before a further message which does not belong to the message repeating sequence is received (for example the first message in a next message repeating sequence). That is to say, the tolerance times ΔW_I (I=0 to N−1) should each be shorter than T_N-T_(N−1), where T_N is the transmission time of the further message. This achieves the situation in which the counter is always at its final value upon receiving the first message in a next message repeating sequence. The counter is then newly available for the next message repeating sequence received by the participant in order to define a waiting interval in response to the successful reception of a message in the message repeating sequence. The counter may be a clocked down-counter, for example. If the participant successfully receives a message while the down-counter is at zero, the participant will set the down-counter to a waiting time defined by the message (that is to say to a counter reading corresponding to the waiting time), with the result that the down-counter begins to count down starting from this starting value. As soon as the down-counter has reached the value zero, the participant stops the down-counter (with the result that the down-counter remains at zero). The participant can then initiate an action defined by the received message. If a statement of the waiting time is missing in the received message, the participant will interpret this as a waiting time of zero and will accordingly initiate the action without delay.

In the embodiment just described, it is advantageous if the tolerance times ΔW_I (I=0 to N−1) are each greater than zero. The waiting interval will then be somewhat longer than absolutely necessary. If another message, rather than the last message, has been selected as the useful message, the risk of the second participant likewise treating the last message as a useful message is reduced. The tolerance times ΔW_I are preferably each at least one clock cycle, preferably at least two clock cycles.

BRIEF DESCRIPTION OF THE DRAWINGS

The invention will be explained in more detail below with reference to figures, in which, in each case in a schematic illustration.

DETAILED DESCRIPTION

Figure 1:
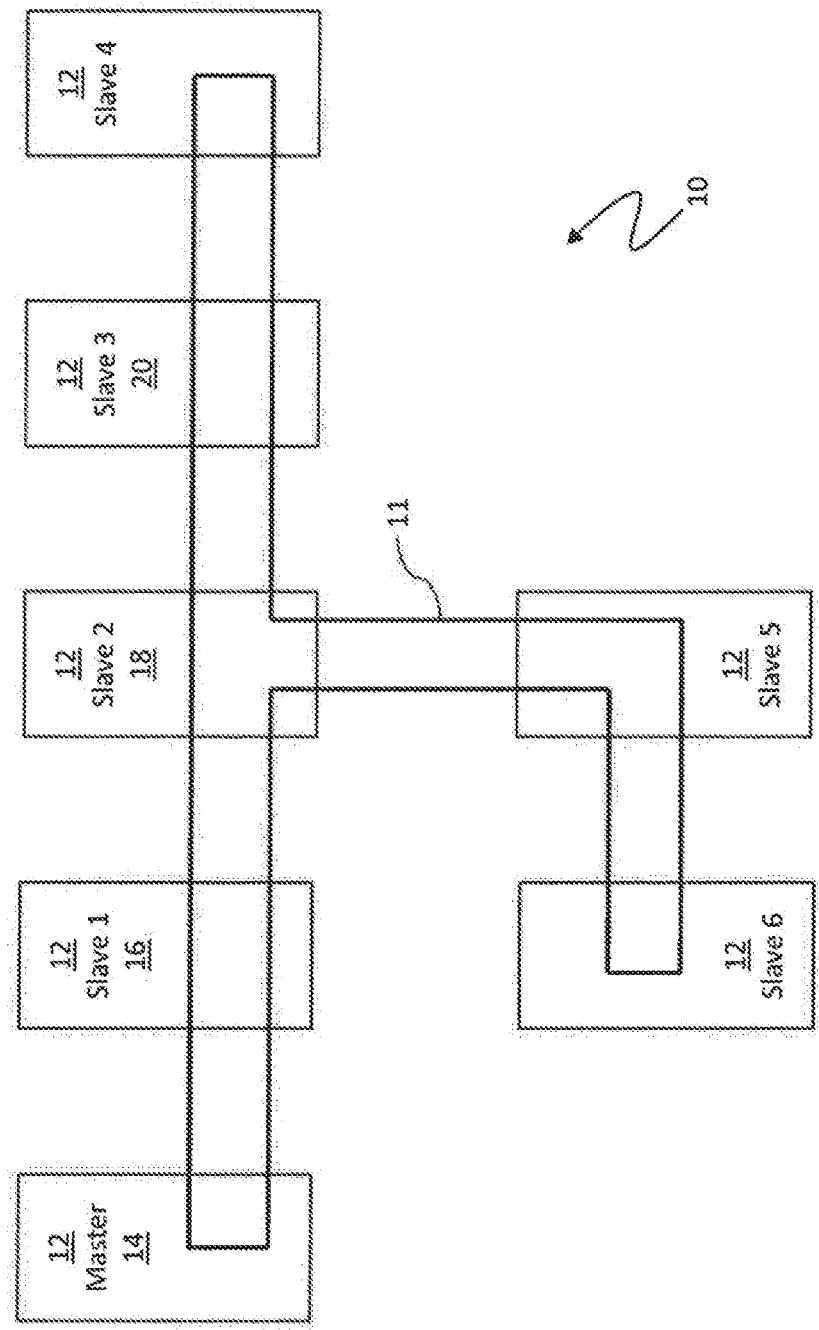
FIG. 1 schematically shows an exemplary embodiment of a communications system.

The schematic example of a communications network (network) 10 illustrated in FIG. 1 comprises a plurality of participants 12 including a first participant 14 and a second participant 16. During operation, the first participant 14 transmits a message repeating sequence consisting of N successive messages, where N≥2. The first participant 14 respectively begins to transmit one of the N messages at N successive transmission times T_I (I=0, . . . , N−1). In this description, the index I−1 is assigned to the Ith message in the message repeating sequence.

Each of the N messages contains a field which defines a waiting time W_I=T_(N−1)−T_I+ΔW_I (where 1=0, . . . , N−1) assigned to the respective message. ΔW_I is a non-negative tolerance time therein. According to one embodiment, the tolerance time ΔW_I is the same for all messages in the message repeating sequence, that is to say ΔW_I=ΔW_0 for each I from 0 to N−1. This makes it possible to minimize the temporal uncertainty of the time at which the action is initiated. According to another embodiment, the tolerance times ΔW_I (1=0, . . . , N−1) are not necessarily identical for all messages in the message repeating sequence, but their differences are smaller than the differences in the transmission times T_I (I=0, . . . , N−1), that is to say |ΔW_I−ΔW_J|<T_(N−1)−T_0 for all I and J from 0 to N−1; if this condition is satisfied, although the temporal uncertainty of the time at which the action is initiated is not minimized, it will still be lower than in a method without a statement of waiting times. The smaller the differences in the tolerance times ΔW_I (1=0, . . . , N−1), the more accurately predictable the time at which the action is initiated.

The second participant 16 selects precisely one message from among all messages in the message repeating sequence which are successfully received by the second participant and evaluates the waiting time stated in the selected message. In an embodiment which can be easily implemented, the second participant selects the message received earliest from among the successfully received messages in the message repeating sequence. If the second participant 16 successfully receives all N messages in the message repeating sequence, for example, the second participant will select the first message in the message repeating sequence (that is to say that message with the index I=0) according to this embodiment. A message can be considered to have been successfully received, for example, when the receiver (here the second participant 16) is able to reconstruct the contents of the transmitted message on the basis of the received message. For this purpose, it is not absolutely necessary for the received message to be an exact copy of the transmitted message. For example, each message can be generated using an error correction method. In this case, the contents of the message have a certain degree of redundancy which makes it possible for the receiver to correct individual bit errors in the message. If the error correction is successful (or if no errors have been determined in the received message), the message is considered to have been successfully received.

In the example shown, the participants 12 are connected in series using communications technology and each message leaving the first participant 14 passes through the further participants 12 in sequence. That is to say, each message is forwarded from one participant to the next. The operations explained in this application on the basis of the transmitter/receiver pair 14, 16 can be implemented in a similar manner in any further transmitter/receiver pair of the network 10, for example in the transmitter/receiver pair 16, 18 or 18, 20.

The network 10 may be an EtherCAT network, the participant 14 being operated as a master device (master) and the remaining participants 12 each being operated as slave participants (slave). During operation, each message leaving the master 14 passes through all participants 12 of the network 10 (possibly with the exception of the master 14) on a forward path and a return path in each case. While the message is passing through the relevant participant, the participant can read data from the message and/or can write data to the message. A data path 11 which is closed per se and passes through the participants is therefore defined in the network. According to another embodiment (not illustrated), the data path 11 does not pass through at least one of the participants 12 exactly twice, but rather once or more than twice. The data path 11 may comprise both wired and wireless sections. The communications network 10 shown here is only an example. In principle, the invention can be implemented in any communications network having at least two participants.

Figure 2:
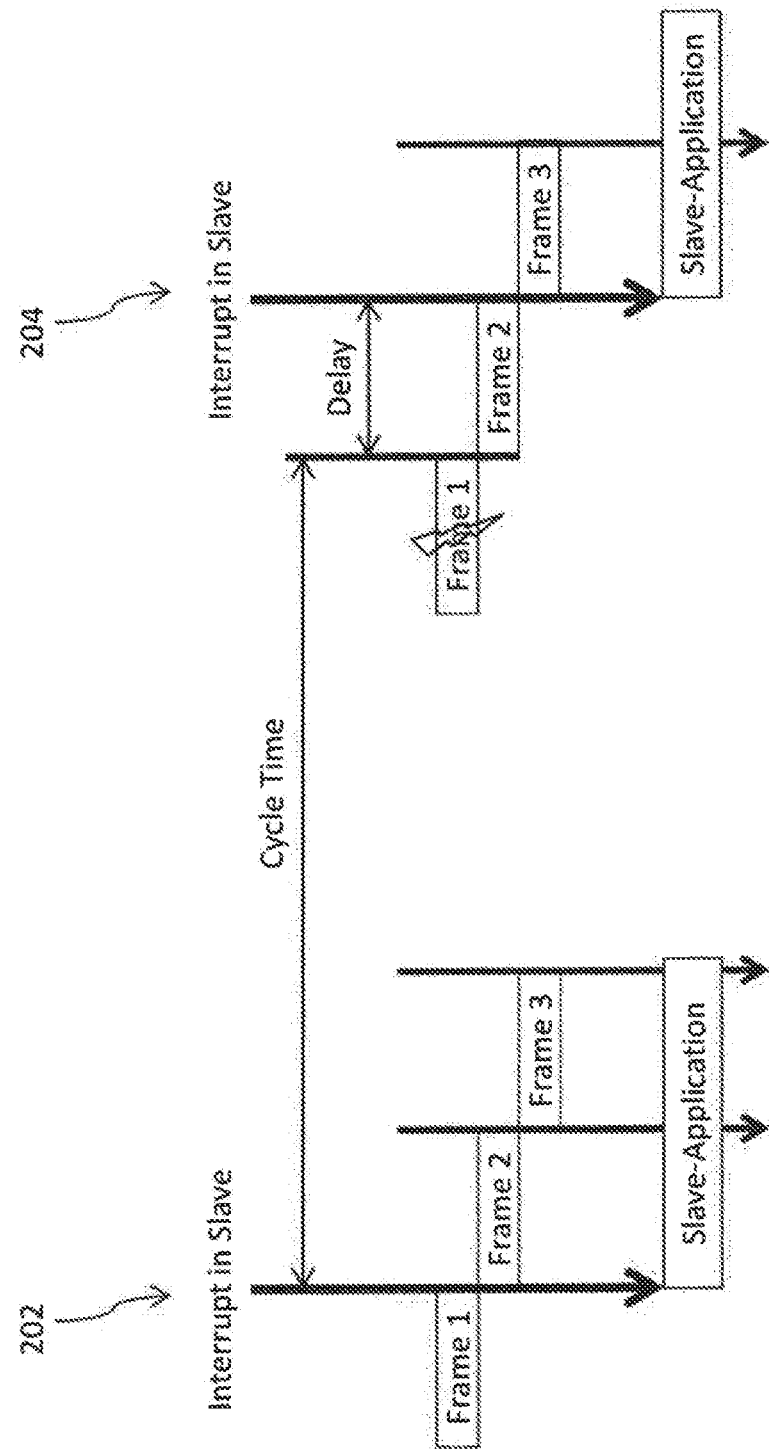
FIG. 2 illustrates the reception of a first and a second message repeating sequence in a participant according to an exemplary embodiment.

FIG. 2 illustrates an example in which the second participant 16 receives a first message repeating sequence S1 and subsequently receives a second message repeating sequence S2. The two message repeating sequences S1 and S2 each comprise three messages (that is to say N=3), namely Frame1, Frame2 and Frame3. The messages Frame1, Frame2 and Frame3 in the first sequence S1 are redundant in the sense that it suffices if the second participant 16 successfully receives and evaluates at least one of the three messages in the message repeating sequence S1. It is not necessary for the second participant 16 to successfully receive more than one message in the message repeating sequence S1. In a simplest embodiment, the redundancy is based on the fact that each message in the message repeating sequence S1 contains the same useful data. In another embodiment, the useful data in the individual messages in the message repeating sequence S1 are not strictly identical, but are equivalent in so far as it is not important, as a result, which message in the message repeating sequence is successfully received and evaluated by the second participant 16. The same accordingly applies to the second message repeating sequence S2.

In the example, the second participant 16 successfully receives the first (that is to say earliest) message in the message repeating sequence S1. In response to the successful reception of Frame1, the second participant 16 initiates an action assigned to the message Frame1 without allowing a waiting time to elapse. That is to say, the second participant 16 carries out the action immediately after detecting that the message has been successfully received, rather than with a delay. The action may comprise, for example, generating an interrupt for the purpose of starting a particular program in the second participant 16. The second and third messages (Frame2 and Frame3) in the first message repeating sequence S1 are ignored by the second participant 16, that is to say are possibly forwarded (for example to the third participant 18), but are not evaluated any further.

The first message Frame1 in the second message repeating sequence S2 is not successfully received by the second participant in the example. Accordingly, although the second participant 16 will forward the first message Frame1 in the second message repeating sequence S2 (depending on the embodiment) to a further participant (for example to the third participant 18) of the communications network, the second participant will not use the contents of the message itself. In particular, the second participant 16 will not carry out an action defined by Frame1 in the message repeating sequence S2. In contrast, the second message Frame2 in the sequence S2 is successfully received by the second participant 16 in the example. In response to the successful reception of Frame2 from S2, the second participant 16 immediately initiates an action which is defined by Frame2 and may comprise the generation of an interrupt, for example. In contrast, the third message Frame3 from S2 will be ignored by the second participant. Each message repeating sequence received by the second participant 16 can therefore initiate an action by the second participant 16 if at least one message in the relevant message repeating sequence is successfully received. An action can therefore be assigned to each message repeating sequence. In the example, the action is respectively initiated and performed by the first successfully received message in the relevant message repeating sequence without allowing a waiting time to elapse. The time at which the action is performed therefore depends on which of the N messages in the sequence is successfully received and therefore cannot be accurately predicted. This may impair the synchronization of actions of the participants of the communications network. This knowledge is taken as a basis for the invention described in more detail below.

Figure 3:
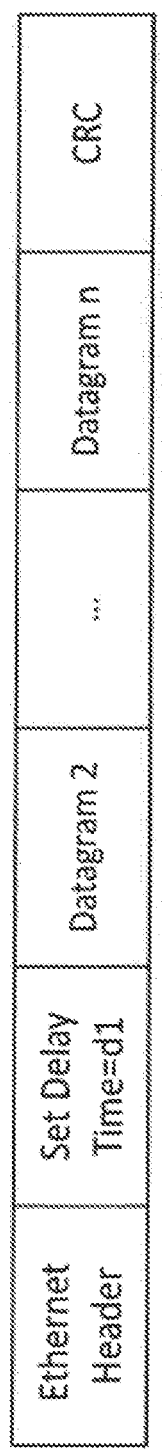
FIG. 3 schematically shows an exemplary embodiment of a message.

FIG. 3 schematically shows an example of a message which comprises the statement of a waiting time. In the example, the message is an EtherCAT message which comprises at least one Ethernet header, one or more datagrams and a check value CRC. Each datagram may be a section of the message addressed to a particular participant of the communications network. That is to say, each datagram may be assigned to a particular participant. According to another embodiment, a datagram is assigned to a plurality of participants. In addition to these and/or further fields of the message, the message comprises a "Set Delay Time=dl" field which contains the statement of the waiting time. The waiting time can be stated in any desired suitable unit, for example in a physical unit of time such as a nanosecond or microsecond, or in another unit, for example a number of clock cycles. In a simple embodiment, the waiting time is stated in the form of the number of the relevant message inside the message repeating sequence. The N messages in the message repeating sequence may be numbered consecutively from 0 to N−1, for example. The message number can be interpreted as a waiting time in so far as it can be translated into a waiting time by the receiving participant (for example the second participant 16). In one embodiment, the transmission times are equidistant with an interval of time d (d is the interval between two successive transmission times) and the second participant calculates the waiting time from the message number I according to $W\_I=(N-1-I)*d+\Delta W\_I$, where $\Delta W\_I$ is the tolerance time mentioned. The statement of a waiting time can be inserted at any desired position in the message, in principle. However, it may be advantageous if the statement of the waiting time is arranged at a position between a header of the message (the Ethernet header in the example shown) and a check value (which is generally provided at the end of the message). This makes it possible to reduce the processing complexity in the receiver. In the example, the waiting time is stated between the Ethernet header and the one or more datagrams.

Figure 4:
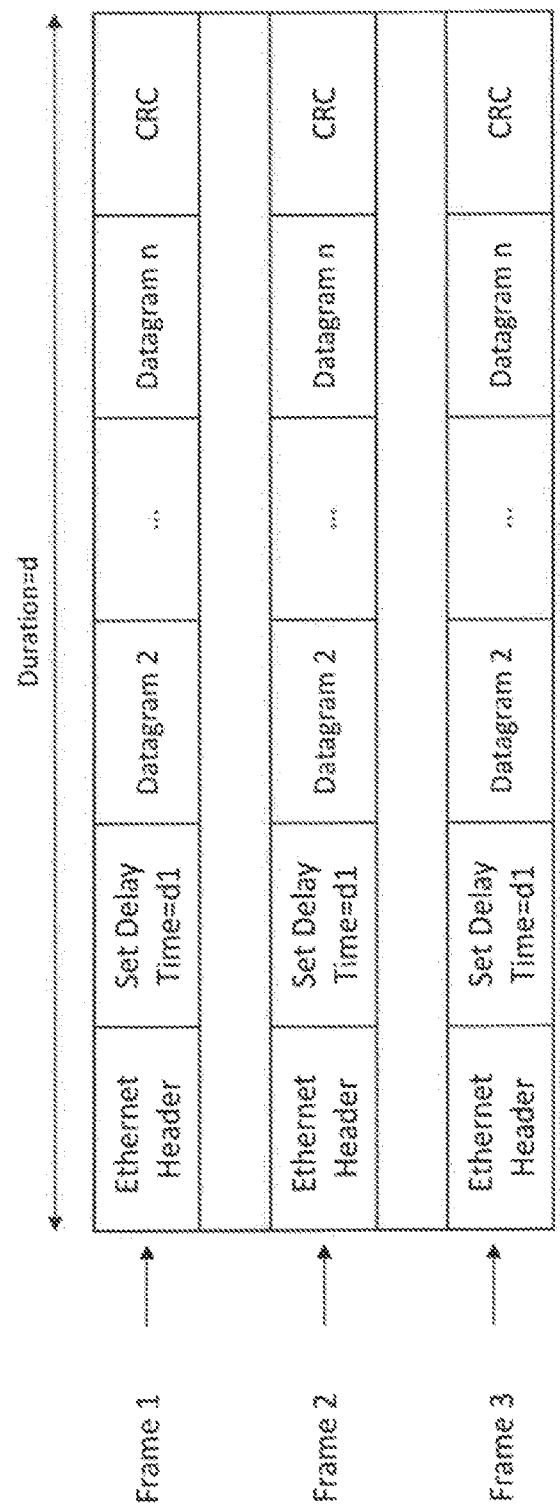
FIG. 4 schematically shows an exemplary embodiment of a message repeating sequence.

FIG. 4 schematically shows an example of a message repeating sequence consisting of N=3 messages Frame1, Frame2 and Frame3. The three messages are illustrated with a vertical offset in the drawing, but are transmitted in succession, for example in direct succession. Each of the three messages contains a field containing the statement of a waiting time $\Delta W\_I$ (I=0, 1, 2) assigned to the relevant message, the messages being numbered consecutively from 0 to 2 with the message index I. In the example, the waiting times are $W\_I=(2-I)*d$. The transmission times of the three messages shown are $T\_I=T\_0+I*d$. That is to say, the messages are each transmitted in succession in a manner offset by the message duration d. During conventional operation, the transit time from the transmitting participant (for example the first participant 14) to the receiving participant (for example the second participant 16) is the same for each message. The messages are therefore received in an offset manner according to the transmission times $T\_I$ (I=0, 1, 2). The corresponding reception times are therefore $T'\_I=T'\_0+I*d$. The receiving participant selects a message (for example the earliest message) from among all successfully received messages in the message repeating sequence and allows the waiting time stated in the selected message to elapse before said participant performs an action assigned to the selected message, for example generates an interrupt. If K is the index of the selected message, the waiting time expires at the time $T'\_K+W\_K$, that is to say at the time $T'\_0+K*d+(2-K)*d=T'\_0+2*d=T'\_2$. The action is consequently performed at the time $T'\_2$ of the reception of the third (and last) message in the message repeating sequence irrespective of which message in the message repeating sequence was selected. Synchronization of the action with events or other actions in the communications network is therefore improved. In the example, the tolerance times $\Delta W\_I$ are zero (that is to say $\Delta W\_I=0$ for I=0 to N−1). The example can be applied to a message repeating sequence having more than three messages without difficulties.

Figure 5:
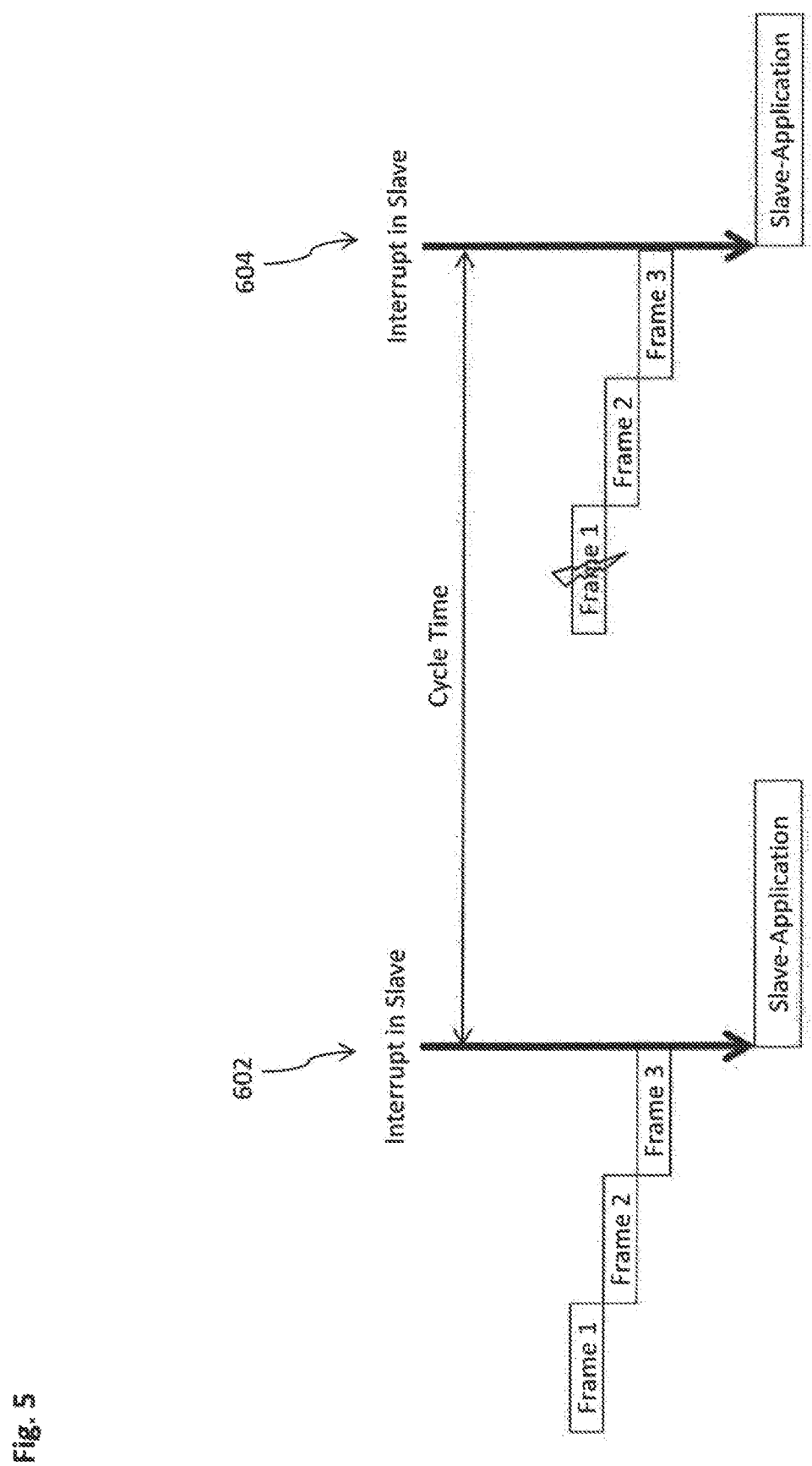
FIG. 5 illustrates the reception of a first message repeating sequence and a second message repeating sequence in a participant according to an exemplary embodiment.

If, as schematically illustrated in FIG. 5, message repeating sequences are transmitted periodically, for example, the waiting time statements in the individual messages cause the sequence of actions (for example interrupts), which corresponds to the sequence of message repeating sequences, to have the same period duration. Period fluctuations (jitter) are therefore greatly reduced in comparison with a conventional scheme in which the selected message initiates immediate performance of the relevant action.

Figure 6:
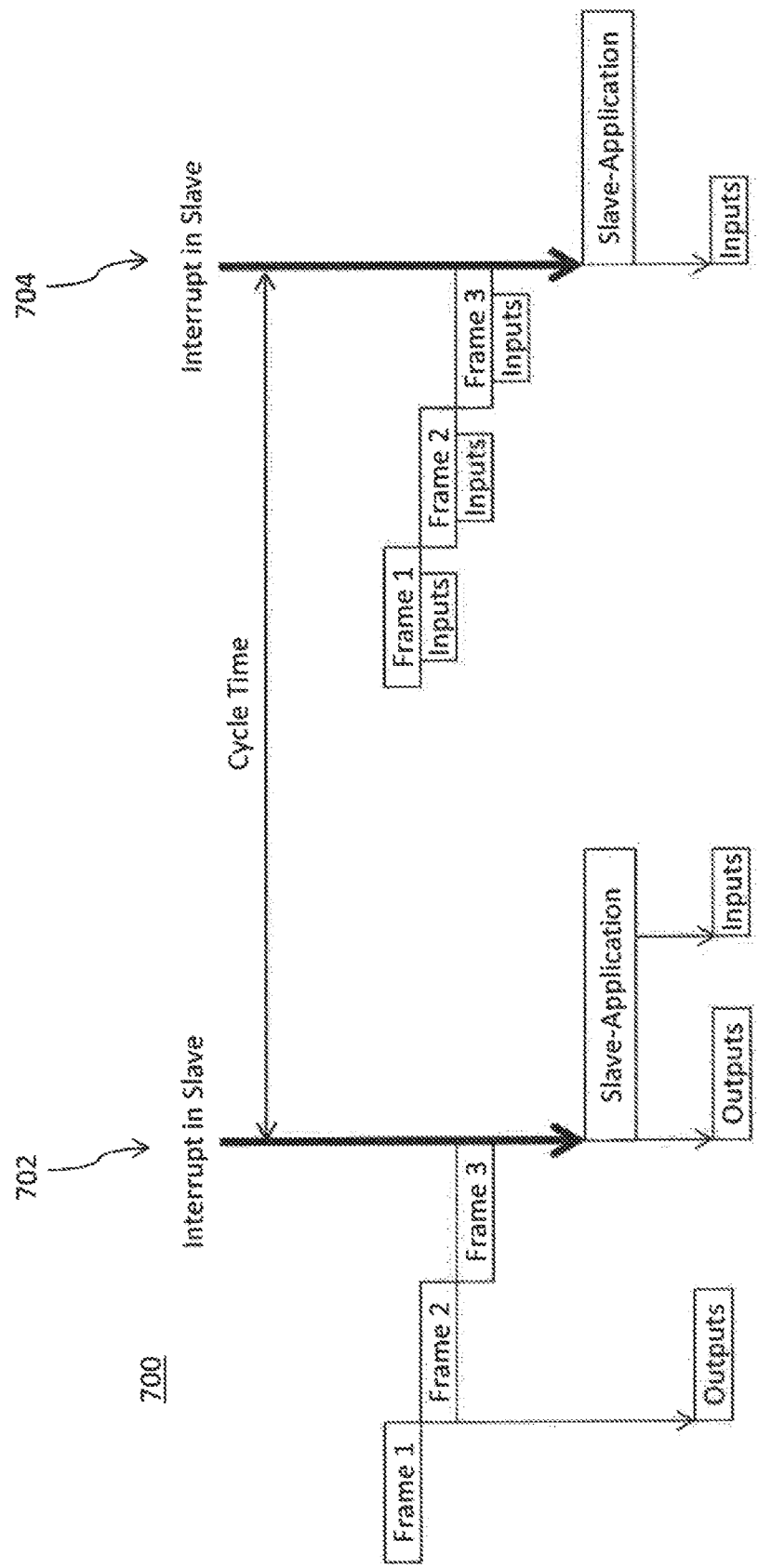
FIG. 6 illustrates the reception and the processing of a write message repeating sequence and of a read message repeating sequence in a participant according to an exemplary embodiment.

FIG. 6 schematically shows an example of a method 600 for operating a participant in a communications network. In the example, the participant (for example the second participant 16) receives a first message repeating sequence 602 inside a first receiving cycle and receives a second message repeating sequence 604 inside a subsequent, second receiving cycle. The two message repeating sequences 602, 604 each comprise three messages, for example, and may each be constructed as described above with reference to FIG. 4, for example. In the example, the participant first of all selects the first message in the first message repeating sequence 602 and writes useful and/or status data from the first message (Frame1) to a buffer. In contrast, the second and third messages (Frame2 and Frame3) are merely forwarded by the participant without the participant buffering data contained in said messages. This is achieved, for example, by prohibiting write access to the buffer, after the useful and/or status data from the first message have been written to the buffer, until the waiting time in the first message has expired (the buffer is in the "buffer full" state). However, the useful and/or status data in the buffer are not immediately made available to the participant application "slave application". The action (for example an interrupt) is initiated only with expiry of the waiting time, that is to say after the reception time of the third message in the sequence 602, and the useful and/or status data in the buffer are made available to the "slave application", with the result that the latter can read the data. The data read from the buffer (for example output data "Outputs" of the master participant 14) are used by the participant (for example as output data), and the buffer changes to the "buffer empty" state after reading. The action causes the "slave application" to receive input data "Inputs" and to write them to a further buffer for input data ("buffer full"). These input data are made available to a further participant (for example the second participant 18) or to the master 14 of the communications network. In the example, this is carried out by means of the second message repeating sequence 604. In the example, the participant copies the data "Inputs" from the buffer to each message in the second message repeating sequence 604. The data "Inputs" are redundantly forwarded with the second message repeating sequence 604. The buffer for input data is reset to the "buffer empty" state (for example so that the buffer then cannot be read again since its contents are now considered to be out of date) only after expiry of the waiting time, that is to say after the reception time of the third message in the sequence 604.

Figure 7:
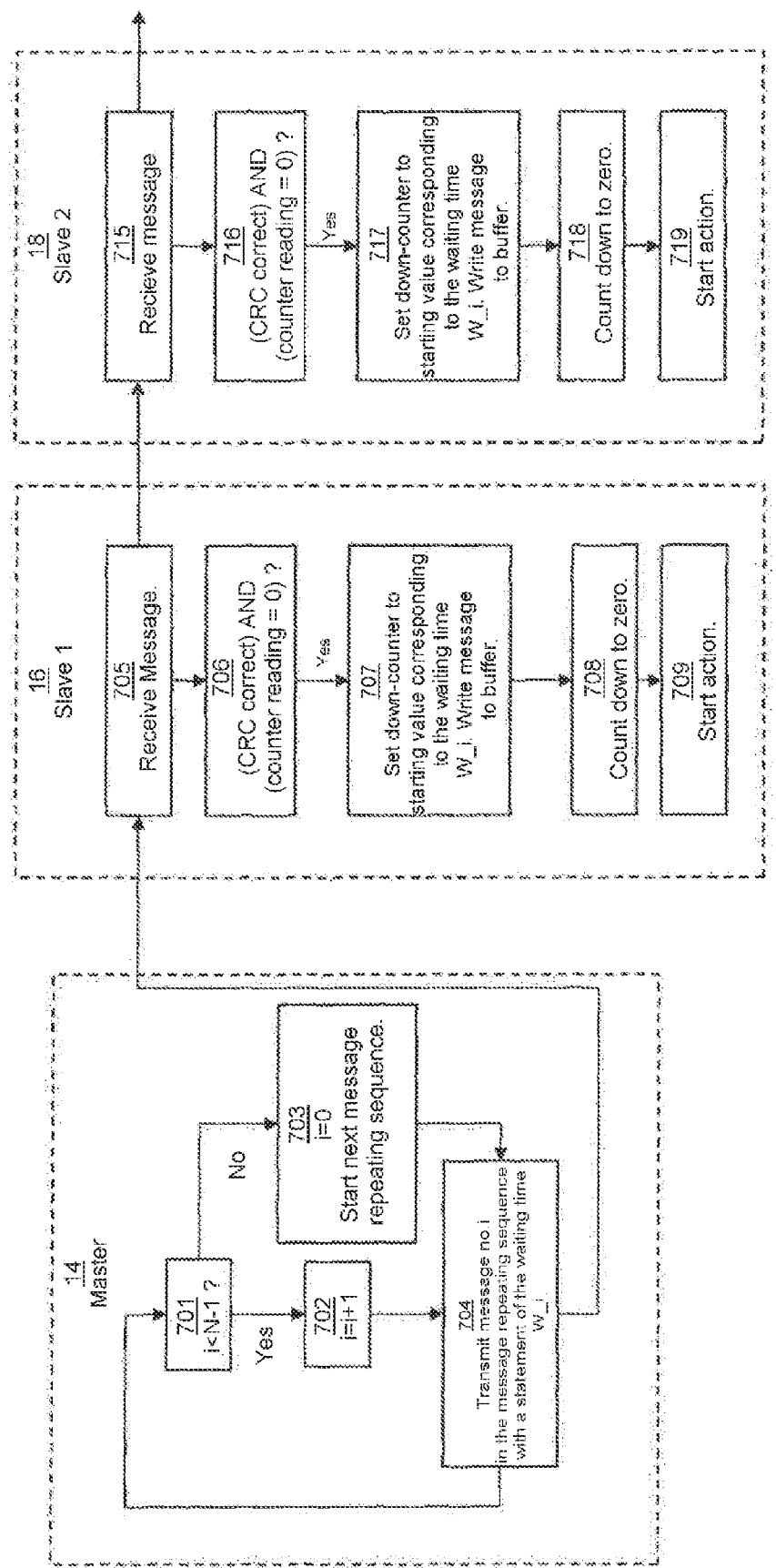
FIG. 7 shows a flowchart of a method for operating a communications network according to an exemplary embodiment.

FIG. 7 illustrates an embodiment of a method for operating a communications network. The communications network may be the network 10 from FIG. 1, for example. The network comprises a plurality of participants, for example the participants 14, 16 and 18. In the example, the participants 14, 16 and 18 are a master participant (master) 14, a slave participant (slave) 16 and a further slave 18, for example in an EtherCAT system.

The first participant 14 is operated in such a manner that the first participant generates a message repeating sequence consisting of N messages (measures 701, 702, 703, 704). After generating the message repeating sequence, the first participant 14 begins to generate a next message repeating sequence (703). The N messages in each message repeating sequence are transmitted in succession from the first participant 14 to the second participant 16 (704). Each of the messages contains the statement of a corresponding waiting time. A waiting time W_I is therefore assigned to the (I+1)th message in the message repeating sequence, that is to say to that message in the sequence which is denoted with the index I, where I=0, . . . , N−1.

The second participant 16 receives the message transmitted by the first participant 14 (705) and checks whether the check value contained in the message is correct and whether the down-counter of the second participant 16 is at zero (706). If these two conditions are met, the second participant 16 sets the down-counter to a starting value corresponding to the waiting time W_I. In addition, the second participant 16 writes the received message, or at least a relevant part thereof, to a buffer (707). The clocked down-counter then counts down to zero (708) in accordance with a clock frequency of the communications network. The waiting time W_I therefore elapses from the determination (706) that the check value is correct and the counter reading is zero until the zero value is reached (708). The action assigned to the received message is initiated (709) as a result of the zero value of the down-counter being reached (708). Instead of the down-counter, it is also possible to use an up-counter. Another final value can be defined instead of the zero value.

It is discerned that, in this embodiment, a message from the message repeating sequence is selected by means of the measure 706, that is to say with the checking of the check value of the received message and with the check in order to determine whether the down-counter is at zero. It goes without saying that the selection can be made on the basis of other criteria in other embodiments.

In the example shown, the second participant 16 forwards each received message (not only the selected message) to a further participant of the communications network, here to the third participant 18, specifically without delay, that is to say without waiting for the expiry of the waiting time stated in the received message. The third participant 18 receives the message (715) and likewise forwards it, for example to a further participant (not illustrated in FIG. 7) or back to the first participant 14 or the second participant 16. The measures 705 to 709 explained with reference to the second participant 16 are implemented in an identical or similar manner (715 to 719) in the third participant 18 in the example. Like the first participant 16, the second participant 18 therefore also selects a successfully received message (716) from among the messages received by the second participant (715) and starts an action (719) after expiry of the waiting time (717, 718) stated in the selected message.

Figure 8:
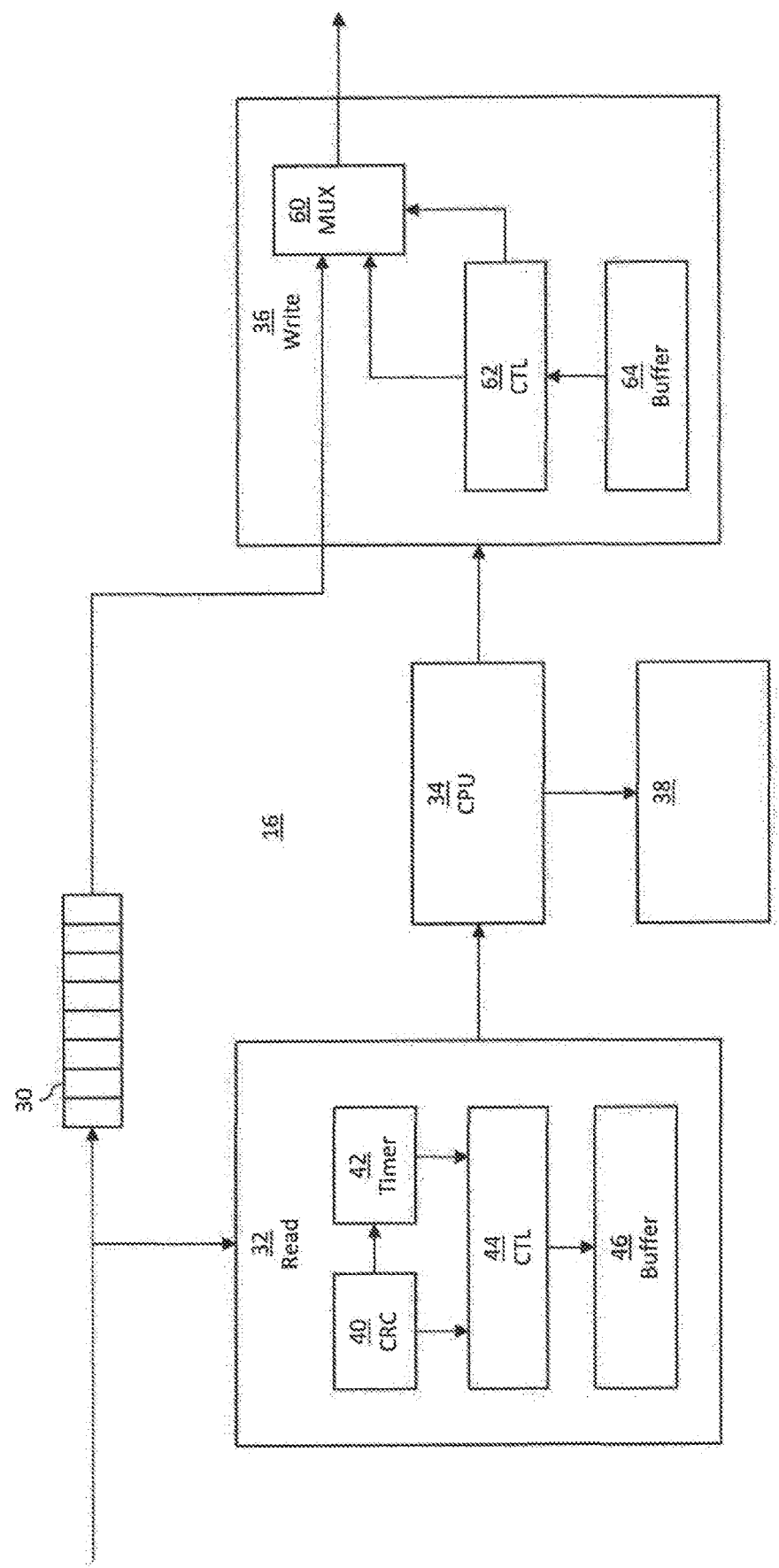
FIG. 8 schematically shows an exemplary embodiment of a participant.

The participant 12 schematically illustrated as an example of an embodiment in FIG. 8 comprises a passage unit 30, a receiver circuit 32, a processing circuit 34, a transmission circuit 36 and a functional unit 38. During operation, a message first of all reaches an input of the passage unit 30 and an input of the receiver circuit 32. The message passes through the passage unit 30 and reaches an input of the transmission circuit 36 with a delay predefined by the passage unit 30. Each individual data item (for example one byte) of the message is either output unchanged by the transmission circuit 36 to an output of the transmission circuit 36 or is replaced with a data item (for example one byte) provided in the transmission circuit 36. The participant 12 can therefore write data for forwarding to one or more other participants (not illustrated in FIG. 8) to the received message, while the message is passing through the participant 12.

The receiver circuit 32 selects a message from among the messages in a received message repeating sequence and transmits the selected message or at least one part of the latter to the control device 34. In the example shown, the receiver circuit 32 transmits the selected message to the control device 34 only after expiry of the waiting time stated in the selected message. In another embodiment, the receiver circuit 32 transmits the selected message to the control device 34 without delay (that is to say without first of all allowing the waiting time to elapse) and signals the expiry of the waiting time to the control device 34 via a separate control signal. In both embodiments, the control device 34 initiates, as a result, an action assigned to the selected message with expiry of the waiting time stated in the selected message. The action may comprise, for example, transmitting a control signal to the functional unit 38. The functional unit 38 may be part of a robot or a sensor in a production plant, for example.

The receiver circuit 32 may comprise, for example, a checking device 40, a down-counter 42, a receiver control circuit 44 and a buffer 46. During operation, the checking device 40 determines whether the message has been successfully received, for example on the basis of a check value in the received message, for example on the basis of a cyclical redundancy check. If the checking device 40 determines successful reception and the down-counter 42 is at zero, the checking device 40 starts the down-counter 42 and provides the control device 44 with a signal which causes the received message (which now constitutes the selected message) to be written to the buffer 46. With expiry of the waiting time, that is to say when the down-counter 42 has reached zero again, the control device 34 evaluates the buffered selected message and initiates a corresponding action on the basis of the contents of the selected message.

The transmission circuit 36 may be a circuit which is known to a person skilled in the art. In the example shown, it comprises a multiplexer 60, a control circuit 62 and a buffer 64. Data which are intended to be written to a message passing through can be held in the buffer 64. The control circuit 62 reads the desired data from the buffer 64 and inserts them into the message passing through at the suitable position by suitably controlling the multiplexer 60.

It goes without saying that the embodiment schematically illustrated in FIG. 8 is only an example and the measures described in the application can be implemented in participants with a different structure.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A method for operating a communications network, wherein:
    the communications network comprises a plurality of participants including a first participant and a second participant,
    wherein the first participant transmits a message repeating sequence consisting of N successive messages to the second participant, where N≥2, wherein a respective action which can be performed by the second participant is assigned to each message in the message repeating sequence,
    wherein the first participant respectively begins to transmit one of the N messages at N successive transmission times T_I (I=0, . . . , N−1), wherein each of the N messages contains a field which defines a waiting time assigned to a respective message of the N messages:

$W\_I = T\_(N-1) - T\_I + \Delta W\_I (I=0, \ldots, N-1),$ where ΔW_I is a non-negative tolerance time, and wherein the second participant selects one message from among the N messages in the message repeating sequence which are successfully received by the second participant as a useful message and measures a time elapsed since the reception of the useful message and performs the action assigned to the useful message when the elapsed time has reached the waiting time assigned to the useful message.

2. The method according to claim 1, wherein the second participant selects the message received earliest by the second participant from among the successfully received messages in the message repeating sequence as the useful message.

3. The method according to claim 1, wherein the action respectively assigned to the messages in the message repeating sequence respectively comprises generating an interrupt.

4. The method according to claim 1, wherein the same action is assigned to each message in the message repeating sequence.

5. The method according to claim 1, wherein, upon successful reception of a further message in the message repeating sequence, the second participant does not perform the action assigned to the further message.

6. The method according to claim 1, wherein the second participant forwards each message in the message repeating sequence which is received by the second participant to a further participant of the communications network or returns said message to the first participant without waiting for the expiry of the waiting time stated in the message.

7. The method according to claim 1, wherein the second participant writes useful data into a useful data field of the received message and forwards the message processed in this manner to a further participant of the communications network or returns said message to the first participant without waiting for the expiry of the waiting time stated in the message.

8. The method according to claim 1, wherein the messages in the message repeating sequence each contain the same useful data and/or the same status data.

9. The method according to claim 1, wherein the messages in the message repeating sequence are processed by the participants in passing.

10. The method according to claim 1, wherein, at a time T_N which is later than T_(N−1), the first participant transmits a further message which does not belong to said message repeating sequence, and wherein the tolerance times ΔW_I are each shorter than T_N−T_(N−1) (I= 0, . . . , N−1).

11. A communications network having a first participant and a second participant, wherein:
    the first participant is set up to transmit a message repeating sequence consisting of N messages, where N≥2, wherein a respective action which can be performed by the second participant is assigned to each message in the message repeating sequence,
    wherein the first participant respectively begins to transmit one of the N messages at N successive transmission times T_I (I=0, . . . , N−1), wherein each of the N messages contains a field which defines a waiting time assigned to a respective message of the N messages:

$W\_I = T\_(N-1) - T\_I + \Delta W\_I (I=0, \ldots, N-1),$ where ΔW_I is a non-negative tolerance time, and wherein the second participant is set up to select one message from among the N messages in the message repeating sequence which are successfully received by the second participant as a useful message and
    to measure a time elapsed since the reception of the useful message and to perform the action assigned to the useful message when the elapsed time has reached the waiting time assigned to the useful message.

12. The communications network according to claim 11, wherein the communications system is an Ethernet network.

13. A participant in a communications network, wherein:
    the participant is set up to receive a message repeating sequence consisting of N messages,
    where N≥2,
    wherein the N messages are transmitted at N successive transmission times T_I (I=0, . . . , N−1),
    wherein each of the N messages contains a field which defines a waiting time assigned to a respective message of the N messages:

$W\_I = T(N-1) - T\_I + \Delta W\_I (I=0, \ldots, N-1),$ where ΔW_I is a non-negative tolerance time,
    to select a message in the message repeating sequence which is successfully received by said participant as a useful message, and
    to measure a time elapsed since the reception of the useful message and to perform an action assigned to the useful message when the elapsed time reaches a waiting time assigned to the useful message.

14. The participant according to claim 13, wherein the participant has a memory and is set up to store a copy of the selected message in the memory at least until the waiting time expires.

15. The participant according to claim 13, wherein the participant has a clocked counter, to which a final value is assigned, and wherein the participant is set up, in response to the successful reception of a message, provided that the counter is then at its final value:
- to select the message as the useful message;
- to determine a starting value corresponding to the waiting time defined by the useful message, to set the counter to the starting value, to start the counter and to stop the counter when the final value is reached; and
- to perform the action assigned to the message only when the down-counter has reached the final value.

16. The participant according to claim 15, wherein the tolerance times $\Delta W\_I$ ($I=0, \ldots, N-1$) are each greater than zero.

* * * * *